Feb. 24, 1925.
W. O. KELLEY ET AL
1,527,362
TIRE APPARATUS
Filed Dec. 18, 1922     3 Sheets-Sheet 2
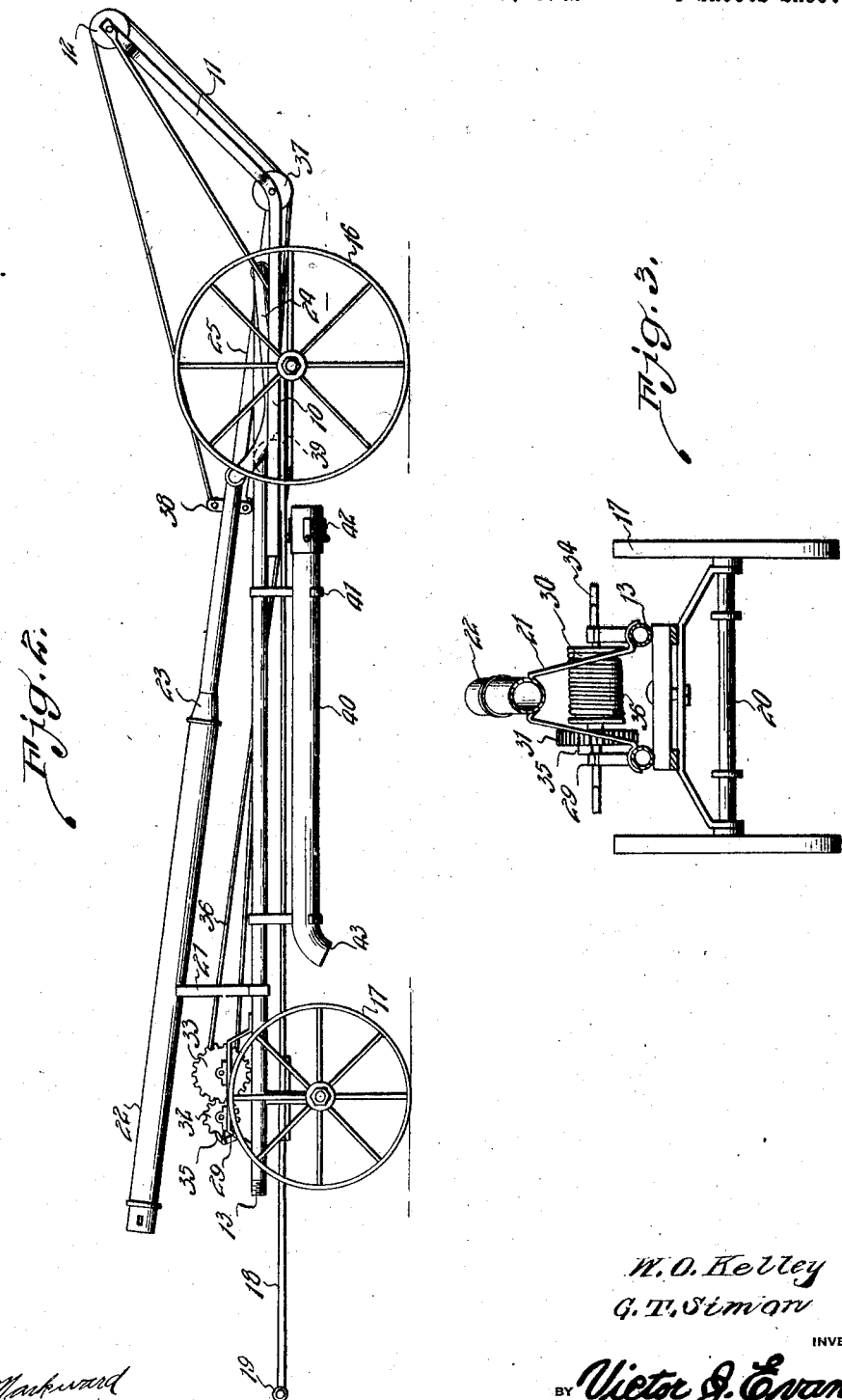
W. O. Kelley
G. T. Simon
INVENTOR
BY Victor J. Evans
ATTORNEY Feb. 24, 1925.                                       1,527,362
W. O. KELLEY ET AL
TIRE APPARATUS
Filed Dec. 18, 1922      3 Sheets-Sheet 3
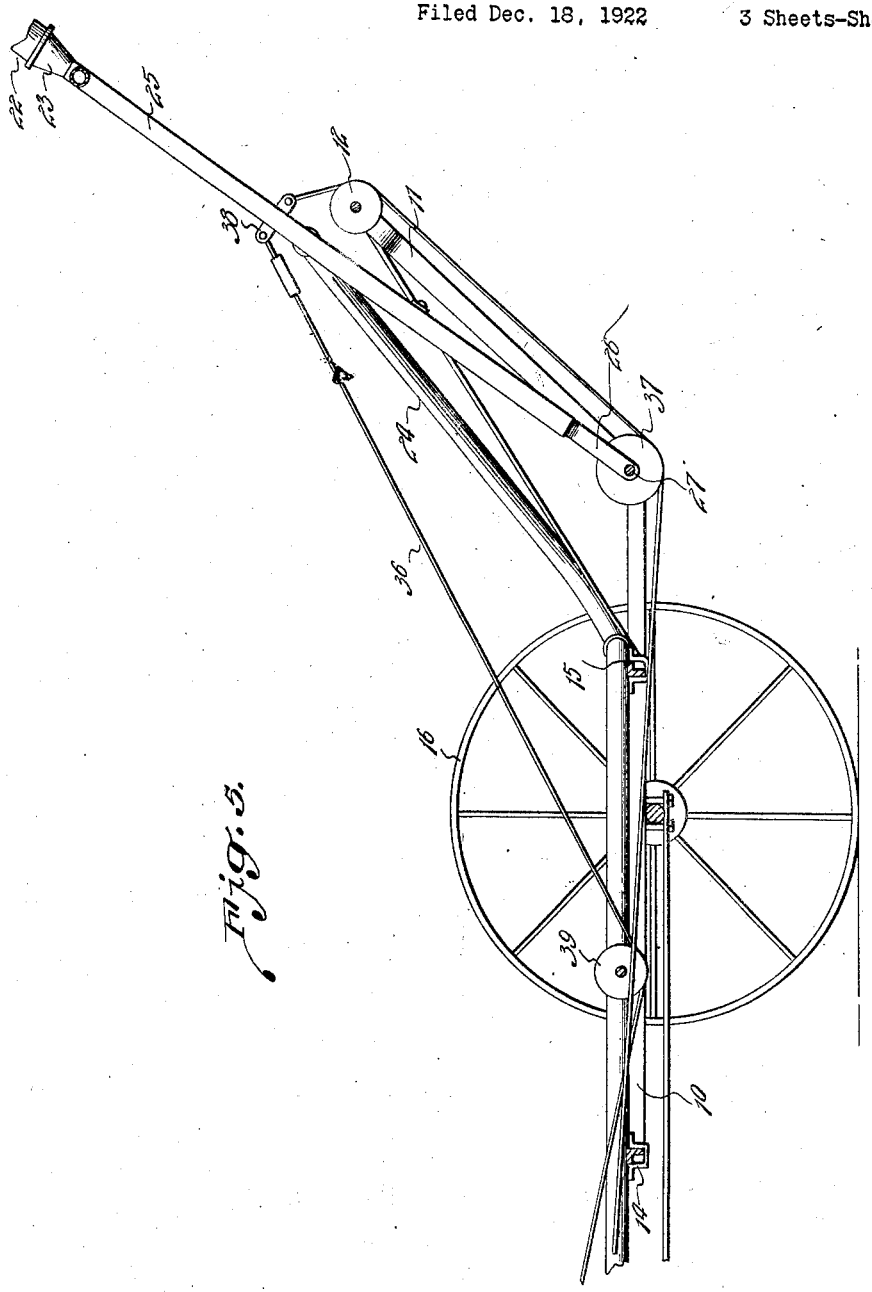
W.O.Kelley
G.T.Simon
INVENTOR
BY Victor J. Evans
ATTORNEY Patented Feb. 24, 1925.

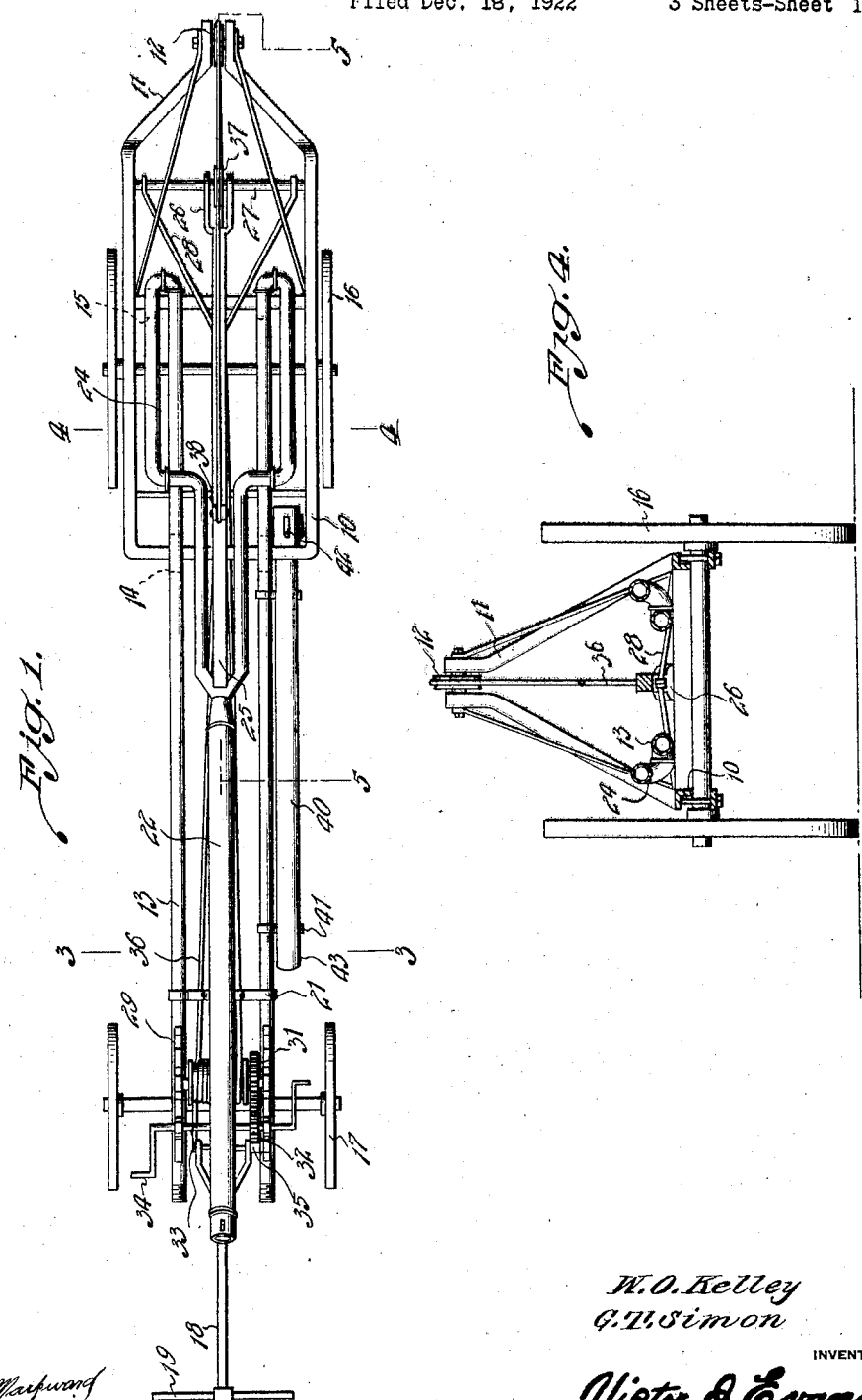

1,527,362

UNITED STATES PATENT OFFICE.

WILLIAM O. KELLEY AND GARDILLE T. SIMON, OF BEAUMONT, TEXAS.

FIRE APPARATUS.

Application filed December 18, 1922. Serial No. 607,647.

*To all whom it may concern:*

Be it known that we, WILLIAM O. KELLEY and GARDILLE T. SIMON, citizens of the United States, residing at Beaumont, in the county of Jefferson and State of Texas, have invented new and useful Improvements in Fire Apparatus, of which the following is a specification.

This invention relates to improvements in apparatus for extinguishing fires and has for an object the provision of means whereby an extinguishing agent may be directed from a proper elevation to reach a relatively high point, the apparatus being especially designed for fighting petroleum tank fires.

Another object of the invention is the provision of an apparatus of the above character, wherein suitable chemicals or fluids may be mixed so as to provide a proper extinguishing agent for the purpose set forth.

Another object of the invention is the provision of a light, durable and convenient apparatus, which may be readily transported and easily operated.

With the above and other objects in view, the invention further includes the following novel features and details of construction, to be hereinafter more fully described, illustrated in the accompanying drawings and pointed out in the appended claims.

In the drawings:—

Figure 1 is a top plan view of the invention.

Figure 2 is a side view of the same.

Figure 3 is a transverse section on the line 3—3 of Figure 1.

Figure 4 is a similar view on the line 4—4 of Figure 1.

Figure 5 is a section on the line 5—5 of Figure 1 showing the discharge pipe elevated.

Referring in detail to the drawings, wherein like characters of reference denote corresponding parts, the invention comprises a frame which includes a rear rectangular frame 10 having upwardly and rearwardly inclined arms 11, whose outer ends converge so as to provide bearing arms for a pulley 12, the purpose of which will be later seen. The frame of the apparatus further includes spaced parallel hollow members or pipes 13 which provide conduits and which have one of their ends connected to the rectangular frame 10 as shown at 14 and 15. The rectangular frame 10 is supported upon wheels 16, while the outer or forward ends of the spaced parallel members or pipes 13 are supported upon wheels 17. Extending forwardly from the frame is a tongue 18 having handles or grips 19 and this tongue may have a suitable connection with the axle 20 of the wheels 17 and the said axle may be mounted for pivotal movement, whereby the apparatus may be conveniently handled.

The spaced parallel members or pipes 13 are connected by a transverse member 21, which in addition to connecting the members 13 provides a bracket for supporting one end of a discharge pipe 22. The inner end of this pipe is in communication with a mixing chamber 23 and the latter is in communication by means of flexible pipe connections 24 with the inner end of the pipes 13. These pipes 13 are adapted for connection with a suitable source of supply, whereby chemicals and liquids may be supplied to the chamber 23 and mixed to provide a suitable extinguishing agent for discharge through the common discharge pipe 22.

The discharge pipe 22 is capable of being elevated for use and for this purpose there is provided a bar or support 25 which has one end connected to the discharge pipe or to the mixing chamber, while its opposite end is provided with spaced ears 26 which are pivotally mounted upon a bar 27 which extends transversely of the frame 10. Inclined braces 28 also connect the bar 27 with the support 25.

Mounted upon the forward ends of the pipes 13 by means of brackets 29 is a hoisting drum 30, the latter having secured to one end a gear 31 which is engaged by a pinion 32. This pinion is mounted upon a transverse shaft 33 which carries crank arms 34 in its opposite ends, so that convenient means is provided whereby the shaft 23 may be rotated to operate the drum 30. A dog or pawl 35 engages the pinion 32 to hold the same against movement.

Wound upon the drum 30 is a cable 36, which passes around a pulley or sheave 37 which is mounted upon the bar 27, the said cable then passing around the pulley or sheave 12 and having its end connected to the support 25 by means of a clamp or bracket 38. The opposite end of the cable 36 passes around a pulley or sheave 39 which is mounted in the frame 10 below the support 25 and this end of the cable is connected to the bracket 38 upon the opposite side of the support through the connection of the first mentioned end of the cable.

By operating the drum 30, the discharge pipe 22 may be raised to the desired elevation and in order to increase the discharge end of the pipe there is provided an extension 40 which is normally mounted in hangers 41 extending downwardly from one of the pipes 13. One end of the extension 40 engages over the outer end of the pipe 22 and is removably secured thereon by means of a spring actuated catch 42. The opposite end of the extension 40 is curved to provide a discharge nozzle 43.

The invention is susceptible of various changes in its form, proportions and minor details of construction and the right is herein reserved to make such changes as properly fall within the scope of the appended claims.

Having described the invention what is claimed is:—

1. An apparatus of the character described comprising a wheel supported frame including spaced longitudinal hollow members defining conduits, a discharge pipe, means pivotally connecting the discharge pipe to the frame, means connecting each of the hollow members to the discharge pipe, whereby pivotal movement of the latter is permitted and means whereby the discharge pipe may be pivotally adjusted and held in adjusted position.

2. An apparatus of the character described comprising a substantially rectangular wheel supported frame, spaced longitudinal hollow members having one of their ends secured to the rectangular frame and defining conduits, wheels secured to and supporting the opposite end of the hollow members, a discharge pipe, means pivotally connecting the discharge pipe and rectangular frame, flexible connections between the conduits and discharge pipe and means whereby the discharge pipe may be pivotally adjusted and held in adjusted position.

3. An apparatus of the character described comprising a wheel supported frame, spaced rigid conduits forming a part of said frame and having one of their ends adapted for connection with separate sources of liquid supply, a discharge nozzle, flexible branch pipes extending from the nozzle and connected to the other ends of the conduits to permit of vertical movement of the nozzle and means whereby the nozzle may be vertically adjusted.

In testimony whereof we affix our signatures.

WILLIAM O. KELLEY.
GARDILLE T. SIMON.